United States Patent
Peng et al.

(10) Patent No.: US 11,166,161 B2
(45) Date of Patent: Nov. 2, 2021

(54) CONTROLLING USER ACCESS TO WIRELESS NETWORK

(71) Applicant: NEW H3C TECHNOLOGIES CO., LTD., Hangzhou (CN)

(72) Inventors: Jianyuan Peng, Beijing (CN); Guoliang Zheng, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 26 days.

(21) Appl. No.: 16/618,093

(22) PCT Filed: May 30, 2018

(86) PCT No.: PCT/CN2018/089046
§ 371 (c)(1),
(2) Date: Nov. 27, 2019

(87) PCT Pub. No.: WO2018/219297
PCT Pub. Date: Dec. 6, 2018

(65) Prior Publication Data
US 2020/0154277 A1 May 14, 2020

(30) Foreign Application Priority Data
May 31, 2017 (CN) .......................... 201710398311.1

(51) Int. Cl.
*H04W 4/00* (2018.01)
*H04W 12/08* (2021.01)
(Continued)

(52) U.S. Cl.
CPC ........... *H04W 12/08* (2013.01); *H04W 12/06* (2013.01); *H04W 24/04* (2013.01); *H04W 36/14* (2013.01);
(Continued)

(58) Field of Classification Search
CPC ..... H04W 24/00; H04W 24/02; H04W 24/04; H04W 24/06; H04W 24/08; H04W 28/04;
(Continued)

(56) References Cited

U.S. PATENT DOCUMENTS

| | | | | |
|---|---|---|---|---|
| 2002/0184387 A1* | 12/2002 | Yamaya | ................ | H04L 49/552 709/238 |
| 2007/0099653 A1* | 5/2007 | Parron | ................... | H04W 76/19 455/552.1 |
| 2017/0242809 A1* | 8/2017 | Hirade | ..................... | G06F 13/24 |

FOREIGN PATENT DOCUMENTS

| | | | |
|---|---|---|---|
| CN | 1881920 A | 12/2006 | |
| CN | 1988566 A | 6/2007 | |

(Continued)

OTHER PUBLICATIONS

ISA State Intellectual Property Office of the People's Republic of China, International Search Report Issued in Application No. PCT/CN2018/089046, dated Aug. 6, 2018, WIPO, 4 pages.
State Intellectual Property Office of the People's Republic of China, Office Action and Search Report Issued in Application No. 201710398311.1, dated Oct. 31, 2019, 12 pages. (Submitted with Partial Translation).

(Continued)

Primary Examiner — Temica M Beamer
(74) Attorney, Agent, or Firm — McCoy Russell LLP

(57) ABSTRACT

A method and a device for controlling user access to a wireless network are provided. According to an example of the method, during master/backup changeover between an master main board and a backup main board in a switch, an AP may start a timer in case of short-term communication interruption between the AP and an master AC due to the master/backup changeover. In this way, if the interruption is within an allowable time period, the AP may maintain connections between the AP and authenticated users instead of imposing offline on the authenticated users.

11 Claims, 5 Drawing Sheets

---

201
An AP starts a timer when detecting an abnormal communication with an a master AC.

202
The AP detects the timer. The AP maintains the connections between the AP and all authenticated users in response to a determination that the preset time has not expired, and imposes offline on all the authenticated users in response to a determination that the preset time has expired.

(51) Int. Cl.
*H04W 12/06* (2021.01)
*H04W 24/04* (2009.01)
*H04W 36/14* (2009.01)
*H04W 52/02* (2009.01)
*H04W 84/12* (2009.01)

(52) U.S. Cl.
CPC ....... *H04W 52/0216* (2013.01); *H04W 84/12* (2013.01)

(58) Field of Classification Search
CPC ... H04W 88/08; H04W 72/04; H04W 72/042; H04W 12/06; H04W 16/18; H04W 36/14; H04W 52/0216; H04W 84/12; H04L 5/0007; H04L 12/2697; H04B 17/0042
USPC .................................. 455/423, 424; 370/329
See application file for complete search history.

(56) References Cited

FOREIGN PATENT DOCUMENTS

| | | |
|---|---|---|
| CN | 101557616 A | 10/2009 |
| CN | 101951616 A | 1/2011 |
| CN | 102256250 A | 11/2011 |
| CN | 102752172 A | 10/2012 |
| CN | 103139750 A | 6/2013 |
| CN | 105577444 A | 5/2016 |
| CN | 105871743 A | 8/2016 |
| CN | 106060859 A | 10/2016 |
| CN | 106067857 A | 11/2016 |
| EP | 1780949 A1 | 5/2007 |
| JP | 2003023407 A | 1/2003 |
| JP | 2007088728 A | 4/2007 |

OTHER PUBLICATIONS

ISA State Intellectual Property Office of the People's Republic of China, Written Opinion of the International Searching Authority Issued in Application No. PCT/CN2018/089046, dated Dec. 3, 2019, WIPO, 9 pages.

State Intellectual Property Office of the People's Republic of China, Office Action and Search Report Issued in Application No. 201710398311.1, dated Mar. 23, 2020, 10 pages. (Submitted with Machine Translation).

European Patent Office, Office Action Issued in Application No. 18809967.5, dated Apr. 6, 2020, Germany, 8 pages.

"Cisco LAN switch Cisco Catalyst 3750 Series High speed stackable multi-layer Intelligence Ethernet switch," Cisco Website, Available Online at https://cisco.com/web/JP/product/hs/switches/cat3750/prodlit/pdf/cat3750_cat2.pdf, Available as Early as Jan. 2004, 13 pages.

Japanese Patent Office, Office Action Issued in Application No. 2019-566298, dated Jan. 5, 2021, 8 pages. (Submitted with Machine Translation).

ISA State Intellectual Property Office of the People's Republic of China, Written Opinion of the International Searching Authority Issued in Application No. PCT/CN2018/089046, dated Aug. 6, 2018, WIPO, 9 pages.

State Intellectual Property Office of the People's Republic of China, Office Action and Search Report Issued in Application No. 201710398311.1, dated Jul. 3, 2020, 15 pages. (Submitted with Machine Translation).

Japanese Patent Office, Decision of Refusal Issued in Application No. 2019-566298, dated Aug. 24, 2021, 6 pages. (Submitted with Machine Translation).

* cited by examiner

CONTROLLING USER ACCESS TO WIRELESS NETWORK

CROSS-REFERENCE TO RELATED APPLICATIONS

The present application is a U.S. National Phase of International Patent Application Serial No. PCT/CN2018/089046 entitled "CONTROLLING USER ACCESS TO WIRELESS NETWORK," filed on May 5, 2018. International Patent Application Serial No. PCT/CN2018/089046 claims priority to Chinese Patent Application No. 201710398311.1, filed on May 31, 2017. The entire contents of each of the above-cited applications are hereby incorporated by reference in their entirety for all purposes.

BACKGROUND

The present disclosure relates to control user access in wireless network communication.

Being applied in a wireless network, an Access Controller (AC) may be connected to a switch such as an aggregation/core switch via a cable. The AC can be used to perform configuration management for different APs and control functions such as authentication and management on wireless users accessing different APs.

For example, an AC performs authentication for a wireless user accessing an AP. The AP may send the user's access authentication information, such as a user name, a password and the like, to the AC mounted on a switch, and the AC may then authenticate the access authentication information and return an authentication result to the AR Thus, when the authentication result indicates a successful authentication, the AP may allow the user to access the network so that the user can go online.

BRIEF DESCRIPTION OF THE DRAWINGS

The accompanying drawings, which are incorporated in the present description and constitute a part of the present description, illustrate examples consistent with the present disclosure and serve to explain the principles of the present disclosure together with the description.

DETAILED DESCRIPTION OF THE EMBODIMENTS

In the present disclosure, there is provided an on-board AC that may be not separated from a switch. The on-board AC refers to that AC functions are integrated into main boards including a master main board and a backup main board of a switch.

Figure 1:
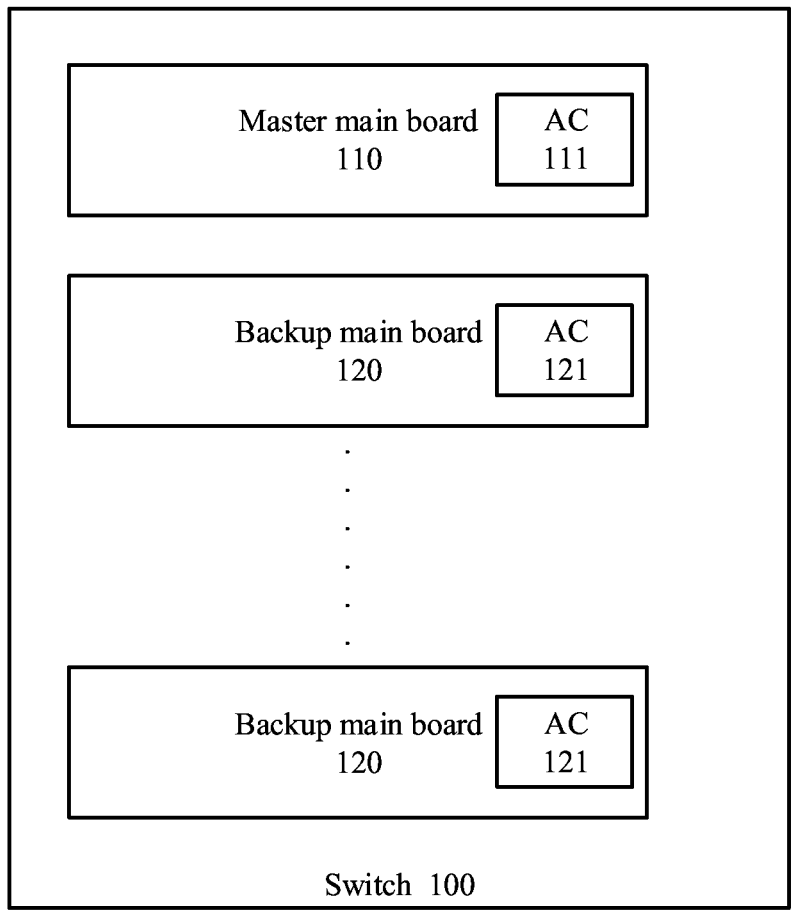
FIG. 1 is a diagram illustrating a structure of an on-board AC according to an example of the present disclosure.

FIG. 1 illustrates a structure of an on-board AC. When a master main board 110 of a switch 100 is integrated with AC function, it is equivalent to that the master main board 110 is integrated with an AC. For convenience of description, the AC integrated on the master main board 110 may be referred to as a master AC 111.

When a backup main board 120 of the switch is integrated with AC function, it is equivalent to that the backup main board 120 is integrated with an AC. For convenience of description, the AC integrated on the backup main board 120 may be referred to as a backup AC 121.

When the master main board 110 is normal, the master AC 111 on the master main board 110 may control and manage an AP and authenticate users accessing the AR Taking authentication of a user accessing the AP for example, the AP may send the user's access authentication information to an interface board (not shown in the figure) of the switch 100. After receiving the access authentication information, the interface board may send the received access authentication information to the master AC 111 on the master main board 110 for authentication. After completing the authentication, the master AC 111 may send authentication results to the interface board, and the interface board may then return the authentication results to the AP, so that the AP can determine whether to allow the user to access the wireless network based on the authentication results.

When the master main board 110 is abnormal, master/backup changeover may be performed between the master main board 110 and one of backup main boards 120. By the master/backup changeover, the abnormal master main board is an new backup main board and one of the backup main board may be activated as an new master main board. Accordingly, the AC integrated on the abnormal master main board 110 may also be changed into a backup AC 121 from the master AC 111 after the abnormal master main board 110 is changed into a backup main board 120; and the AC integrated on the backup main board 120 may also be changed into the master AC 111 from the original backup AC 121 after the backup main board 120 is changed into the master main board 110.

In a practical application, the master/backup changeover may generally take dozens of seconds. As a result, communication between an AP and the master AC 111 may be interrupted for dozens of seconds. When detecting that communication with the master AC 111 is unachievable, the AP will autonomously force a currently-connected user to go offline.

Figure 2:
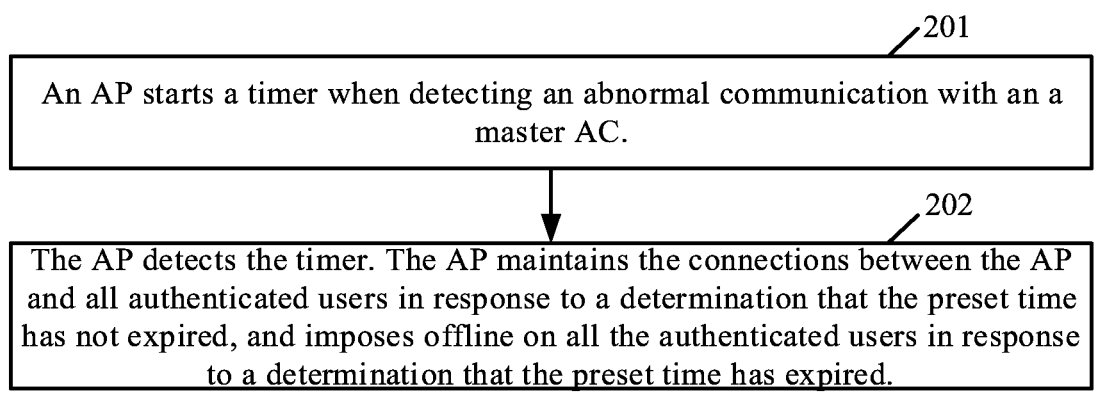
FIG. 2 is a flowchart illustrating a method according to an example of the present disclosure.

To prevent an AP from imposing offline on users being currently-online during the master/backup changeover, the present disclosure provides a flow as shown in FIG. 2.

FIG. 2 is a flowchart illustrating a method according to an example of the present disclosure. The method may be applied to an AP. As shown in FIG. 2, the method may include the following blocks.

At block 201, an AP starts a timer when detecting an abnormal communication with a master AC.

As described above, the master AC mentioned here may be an AC integrated on a master main board of a switch.

There may be several causes for the abnormal communication between the AP and the master AC, and one of those may be the master/backup changeover between the master main board where the master AC is located and a corresponding backup main board. However, in this disclosure, it takes that the master/backup changeover causes the abnormal communication between the AP and the master AC as an example.

To avoid a hostile hacker attack from interfering with communication between the AP and the master AC, a tolerable interruption time for communication between the AP and the master AC may be configured. In an example, a timer may be configured with a preset time, for example, by default 5 minutes, based on the tolerable interruption time for communication between the AP and the master AC.

When the preset time being configured for the timer hasn't expired, the AP may maintain all the authenticated users online, i.e., maintain the connections between the AP and all the authenticated users. When the preset time being configured for the timer has expired, i.e., after the time of the timer exceeds the configured preset time, the AP may determine that the master AC breaks down and impose offline on all authenticated users which are currently-online Details may be referred to block 202.

At block 202, the AP detects the timer. The AP maintains the connections between the AP and all authenticated users in response to a determination that the preset time hasn't expired; the AP imposes offline on all the authenticated users in response to a determination that the preset time has expired.

It can be seen that the preset time of the timer is considered as a precondition for the AP to determine whether to disconnect all the authenticated users which are currently-online in the present disclosure. When the preset time of the timer hasn't expired, the connections between the AP and the authenticated users may be maintained. When the preset time of the timer has expired, the AP may disconnect all the authenticated users to impose offline on all the authenticated users. It is avoided that the AP immediately imposes offline on all the authenticated users which connect to the AP when the communication between the AP and the master AC is abnormal.

As described above, the flow shown in FIG. 2 is completed.

As can be seen from the flow shown in FIG. 2, in the present disclosure, during the master/backup changeover between the master main board and the backup main board on the switch, even though the master/backup changeover causes short-time communication interruption between the AP and the master AC, the AP may still maintain connections between the AP and all the authenticated users without immediately imposing offline on the authenticated users when the interruption occurs within a tolerable time period. Thus, it can be effectively guaranteed that all the authenticated users connected to the AP will not go offline during the master/backup changeover.

In the present disclosure, after the master/backup changeover is completed between the master main board and the backup main board on the switch, the original master main board may be changed into a new backup main board; accordingly, an AC on the original master main board may be changed into a new backup AC from the original master AC. The backup main board involved in the master/backup changeover is changed into the master main board, hereinafter referred to as a new master main board; and an AC integrated on the new master main board is changed into the master AC, hereinafter referred to as a new master AC from the original backup AC.

When the master/backup changeover is completed between the master main board and the backup main board in the switch, the new master AC will replace the original master AC, and the AP will communicate with the new master AC.

The time period of the master/backup changeover may be less than or equal to the preset time of the timer. In the case of detecting the master/backup changeover is completed between the master main board and the backup main board in the switch, the AP may turn off the timer when detecting that the preset time of the timer does not expire, so that the AP may communicate with the new master AC.

Figure 3:
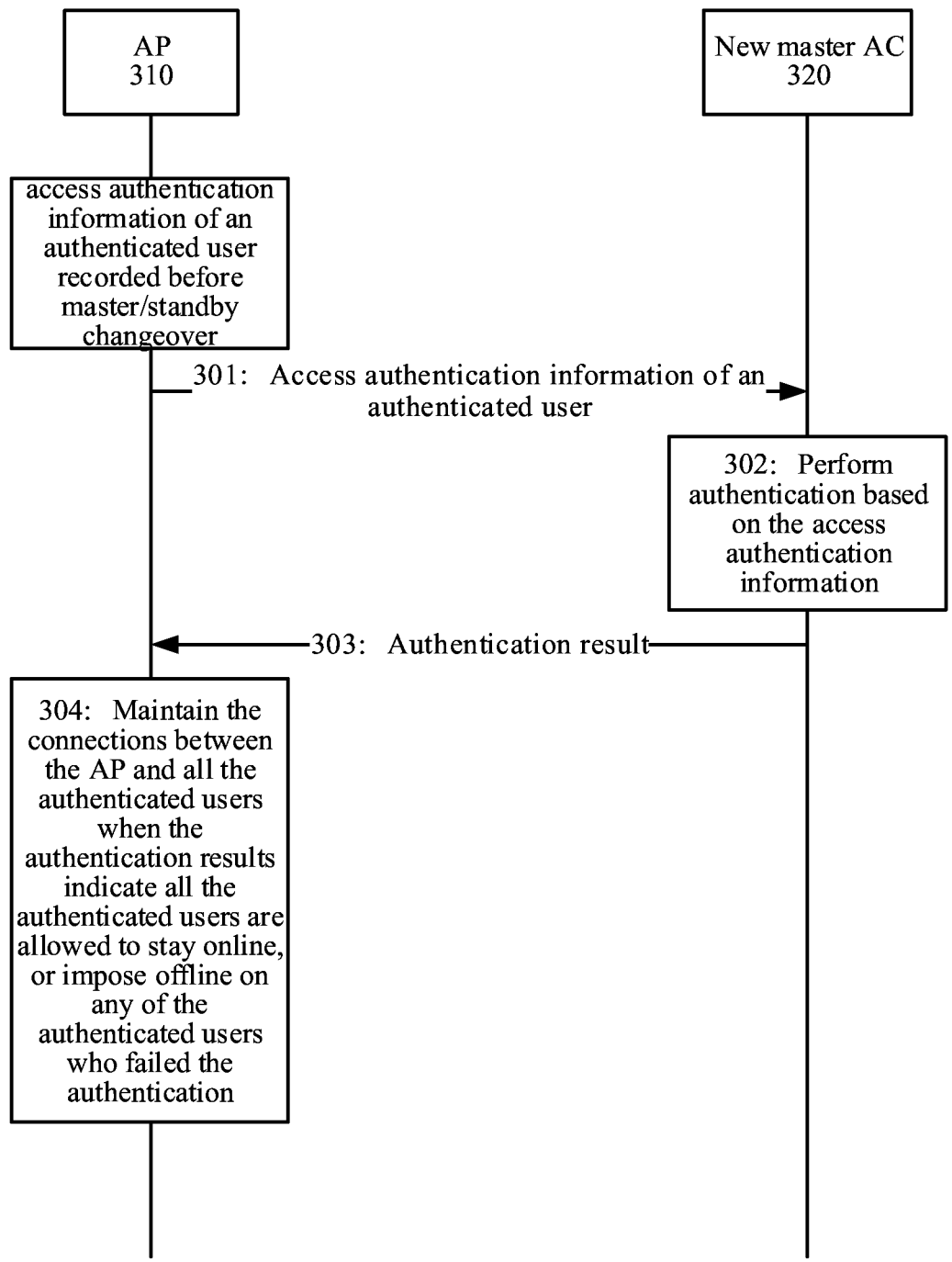
FIG. 3 is a schematic diagram illustrating normal communication between an AP and a new master AC according to an example of the present disclosure.

In an example, the communication between the AP with the new master AC is shown in FIG. 3.

At block 301, an AP 310 may send access authentication information of authenticated users to a new master AC 320, so that the new master AC 320 can determine whether to allow the authenticated users stay online.

Here, the authenticated users are users who have accessed the AP and have been already successfully authenticated by the AC integrated on the original master main board.

Even for the authenticated users, some of them may have time limits for accessing network, and may have to go offline when they have been accessed the network over their time limits Therefore, at block 301, the AP 310 may send the access authentication information of the authenticated users to the new master AC 320, so that the new master AC 320 can determine whether to keep the authenticated users online.

Here, the access authentication information may include: a user name, a password, and the like, which will not be particularly limited herein.

At block 302, the new master AC 320 may perform authentication based on the received access authentication information to determine whether to keep the authenticated users online.

At block 303, the AP 310 receive authentication results returned by the new master AC 320.

At block 304, the AP 310 may maintain the connections between the AP 310 and all the authenticated users when the authentication results indicate all the authenticated users are allowed to stay online, or the AP 310 may impose offline on any of the authenticated users who failed the authentication.

As shown in FIG. 3, by block 301, block 304 and block 305, the new master AC may be facilitated to perform timely management over authenticated users after the master/backup changeover.

Figure 4:
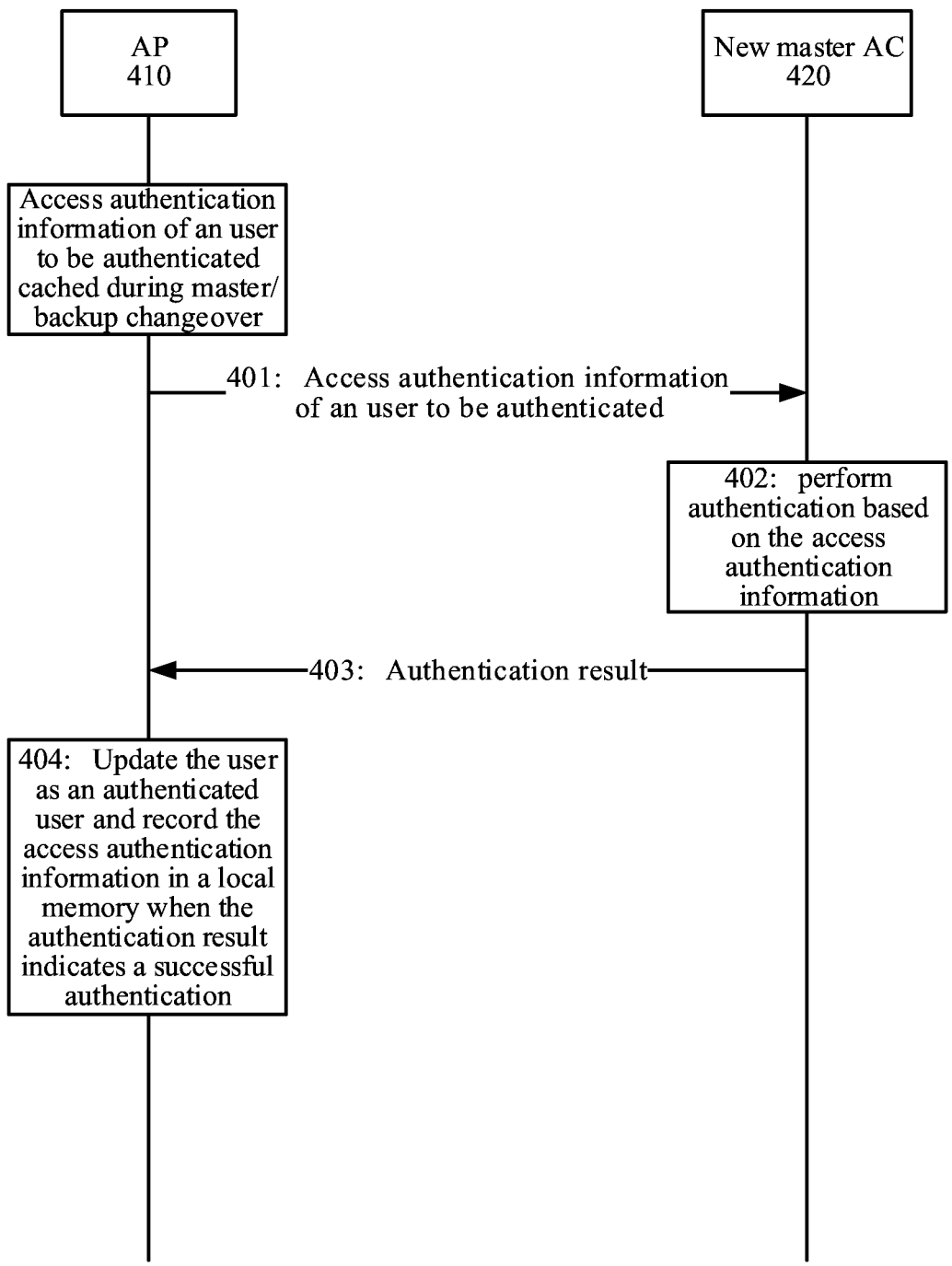
FIG. 4 is a schematic diagram illustrating normal communication between an AP and a new master AC according to another example of the present disclosure.

In another example, the communication between the AP and the new master AC is shown in FIG. 4.

At block 401, an AP 401 may send access authentication information which is cached during the master/backup changeover for a user to be authenticated to a new master AC 420 for authentication.

In the present disclosure, during the master/backup changeover, the AP may receive an authentication request from the user to be authenticated and cache the access authentication information for the user to be authenticated. When the master/backup changeover is completed, the AP may send the cached access authentication information of the user to be authenticated to the new master AC for authentication.

At block 402, the new master AC 420 may perform authentication based on the received access authentication information to determine whether to keep the user online.

At block 403, the AP 410 may receive an authentication result returned by the new master AC 420 for the user to be authenticated.

At block 404, when the authenticated result indicates a successful authentication, the AP 410 may update the user to be authenticated as an authenticated user, and may record the cached access authentication information in a local memory.

In present disclosure, the cached access authentication information is recorded in the local memory for a purpose that: when an master/backup changeover occurs again subsequently, a new master AC after the changeover may perform timely management for the authenticated user according to the flow shown in FIG. 3.

As shown in FIG. 4, the AP 410 may firstly cache an authentication request from a user to be authenticated when the communication between the AP 410 and the master AC becomes abnormal due to the master/backup changeover, and then send the access authentication information of the user to be authenticated to the new master AC 420 for authentication when the AP 410 and the new master AC 420 are communicably connected. In this way, since the user to be authenticated does not need to send the authentication request repeatedly, the user experience can be effectively improved.

The method provided in the present disclosure will be described below with a specific example.

Figure 5:
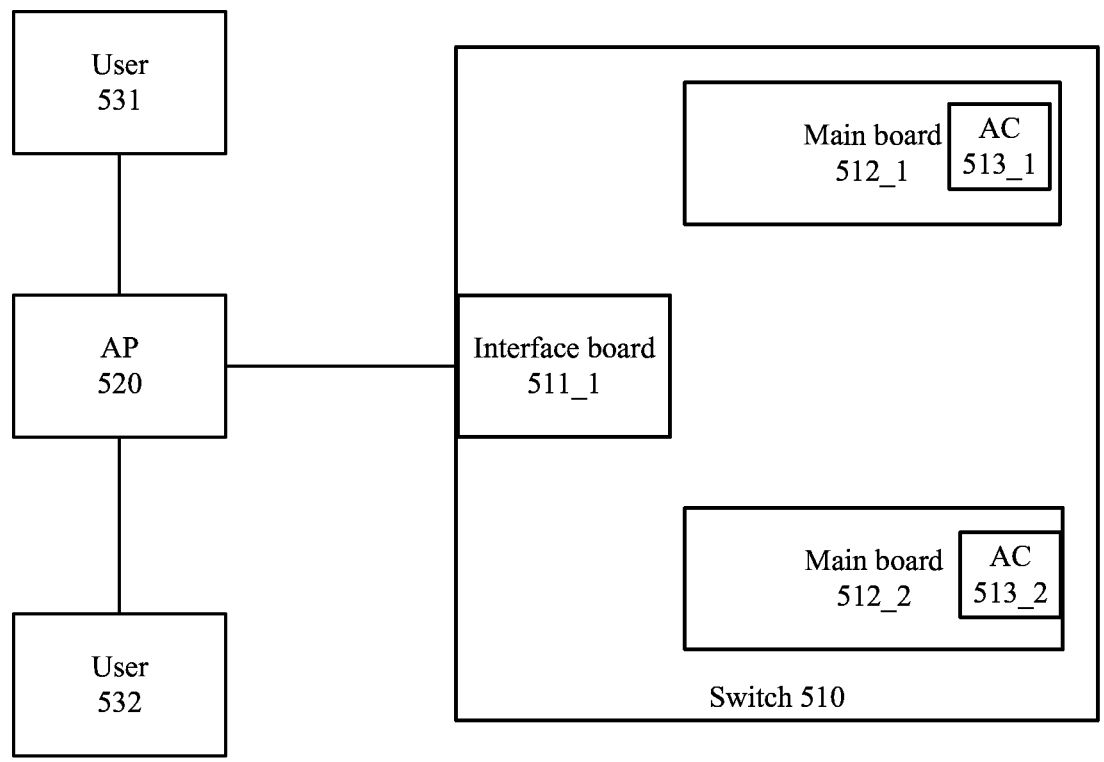
FIG. 5 is a schematic diagram illustrating an example of the present disclosure.

FIG. 5 is a schematic diagram illustrating an example of the present disclosure. In FIG. 5, an interface board 511_1 of a switch 510 is connected with an AP 520.

In an example, FIG. 5 only illustrates that the switch 510 has two main boards 512_1, 512_2. The main boards 512_1, 512_2 are both integrated with ACs, where the main board 512_1 is an master main board, and an AC 513_1 integrated on the main board 512_1 is an master AC; the main board 512_2 is a backup main board, and an AC 513_2 integrated on the main board 512_2 is a backup AC.

As shown in FIG. 5, after accessing the AP 520, a user 531 may send an authentication request to the AP 520 when intending to access a network. The access authentication information of the user 531, such as a user name, a password, and the like, may be carried in the authentication request.

The AP 520 may receive the authentication request from the user 531 and send the access authentication information of the user 531 carried in the authentication request to the switch 510 connected with the AP 520.

The interface board 511_1 of the switch 510 may receive the access authentication information of the user 531 from the AP 520 and send the access authentication information of the user 531 to the main board 512_1 serving as the master main board.

The main board 512_1 may receive the access authentication information of the user 531 and send the received access authentication information of the user 531 to the locally integrated AC 513_1 serving as an master AC for authentication.

The AC 513_1 may authenticate the received access authentication information of the user 531. The specific authentication approach may be any AC authentication approach that is well known to those skilled in the art, which will not be redundantly described herein.

The AC 513_1 may return an authentication result of the user 531 to the interface board 511_1.

The interface board 511_1 may return the received authentication result of the user 531 to the AP 520.

The AP 520 may receive the authentication result of the user 531, and update the user 531 as an authenticated user when the authentication result indicates a successful authentication, and record the access authentication information of the user 531 in a local memory at the same time, and then allow the user 531 to access a wireless network. When the authentication result indicates an authentication failure, the user 531 may be prohibited from accessing the wireless network, etc.

When the main board 512_1 serving as the master main board is abnormal, a master/backup changeover may be carried out between the main board 512_1 and the main board 512_2 serving as the backup main board.

During the master/backup changeover between the main board 512_1 and the main board 512_2, the AP 520 may detect that the communication between the AP 520 and the main board 512_1 serving as the original master main board is abnormal.

When detecting that the communication between the AP 520 and the main board 512_1 is abnormal, the AP 520 may start a timer. The timer may be configured with a preset time which is based on a tolerable interruption time for communication between the AP and the AC. The preset time may be configured greater than or equal to a time period required to complete the master/backup changeover based on experience.

The AP 520 may detect the timer. The AP 520 may maintain the connection between the AP 520 and the authenticated user 531 in response to a determination that the preset time has not expired; the AP 520 may disconnect the user 531 to impose offline on the authenticated user 531 in response to a determination that the preset time has expired.

When the timer has not expired the preset time, a new user 532 accesses the AP 520, for example, an authentication request sent by the user 532 is received, the AP 520 may cache the access authentication information of the user 532 such as a user name, a password and the like carried in the received authentication request.

When the master/backup changeover is completed between the main board 512_1 and the main board 512_2 serving as the original backup main board, the main board 512_1 may be updated as a backup main board and the AC 513_1 integrated on the main board 512_1 may be updated as a backup AC. Correspondingly, the main board 512_2 may updated as the master main board and the AC 513_2 integrated on the main board 512_2 may be updated as the master AC.

After being updated as the master AC, the AC 513_2 may send a notification via the interface board 511_1 to inform the AP 520 that the AC 513_2 serves as the master AC.

When receiving the notification from the AC 513_2, the AP 520 determines that the master/backup changeover between the main board 512_1 and the main board 512_2 is completed. The AP 520 may turn off the timer in response to a determination that the timer has not expired the preset time.

When determining that the master/backup changeover is completed between the main board 512_1 and the main board 512_2, the AP 520 may send the access authentication information of the authenticated user 531 to the main board 512_2 serving as the master main board.

The main board 512_2 may receive the access authentication information of the user 531 via the interface board 511_1 and send the received access authentication information of the user 531 to the locally integrated AC 513_2 serving as the master AC for authentication.

The AC 513_2 may perform authentication based on the received access authentication information of the user 531 to determine whether to allow the user 531 to stay online. The specific authentication approach will not be limited herein.

The AC 513_2 may return an authentication result indicating whether the user 531 is allowed to stay online to the interface board 511_1.

The interface board 511_1 may return the authentication result indicating whether the user 531 is allowed to stay online to the AP 520.

When the authentication result indicating whether the user 531 is allowed to stay online is received, if the authentication result indicates the user to stay online, the AP 520 may maintain the connection between the AP 520 and the user 531, otherwise, the AP 520 may impose offline on the user 531 by disconnecting the connection between the AP 520 and the user 531.

Similarly, when determining that the main board 512_2 is updated as the master main board and the AC 513_2 integrated on the main board 512_2 is updated as the master AC, the AP 520 may send the cached access authentication information of the user 532 to the switch 510 connected with the AP 520.

The interface board 511_1 of the switch 510 may receive the access authentication information of the user 532 from the AP 520 and send the access authentication information of the user 532 to the main board 512_2 serving as the master main board.

The main board 512_2 may receive the access authentication information of the user 532 and send the received access authentication information of the user 532 to the locally integrated AC 513_2 serving as the master AC for authentication.

The AC 513_2 may authenticate the received access authentication information of the user 532. The specific authentication approach may be any AC authentication approach that is well known to those skilled in the art, which will not be redundantly described herein.

The AC 513_2 may return an authentication result of the user 532 to the interface board 511_1.

The interface board 511_1 may return the received authentication result of the user 532 to the AP 520.

The AP 520 may receive the authentication result of the user 532. When the received authentication result indicates a successful authentication, the AP 520 may update the user 532 as an authenticated user, record the access authentication information of the user 532 in a local memory, and allow the user 532 to access the wireless network. When the received authentication result indicates an authentication failure, the user 532 may be prohibited from accessing the wireless network, etc.

In the present disclosure, When the master/backup changeover is completed between the main board 512_1 and the main board 512_2, the access authentication information of the user 531 and the access authentication information of the user 532 may be sent together by the AP 520 to the new master AC in the switch, and may be also sent separately to the new master AC, which will not be specifically limited herein.

The example shown in FIG. 5 is described above.

The method provided in the present disclosure is described above, and a device provided in the present disclosure will be described below.

Figure 6:
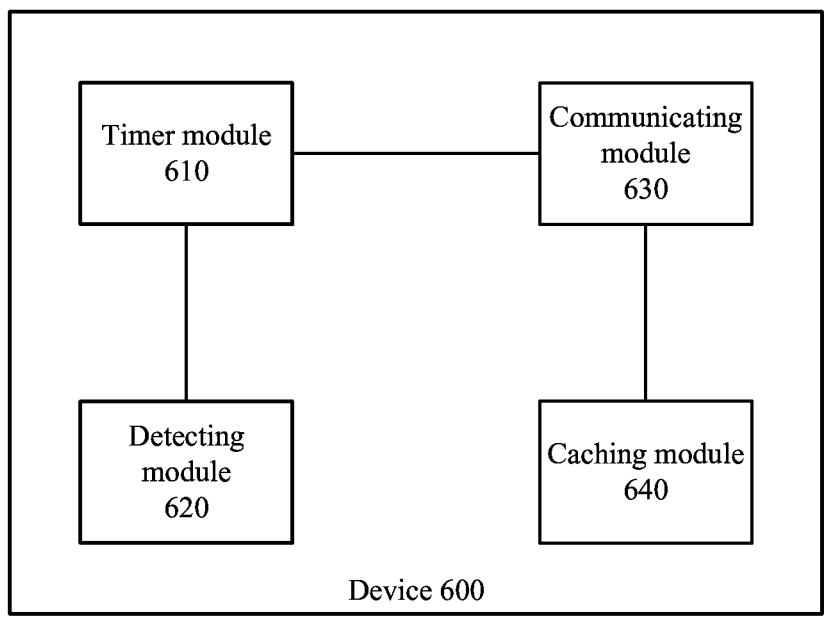
FIG. 6 is a schematic diagram illustrating a structure of a device according to an example of the present disclosure.

FIG. 6 is a schematic diagram illustrating a structure of a device according to an example of the present disclosure. The device 600 may be applied to an AP and may include a timer module 610 and a detecting module 620.

The timer module 610 may be configured to start a timer when abnormal communication between the AP and a master AC is detected. In an example, the master AC is integrated on a master main board of a switch, and the AP may be connected to an interface board of the switch. The abnormal communication between the AP and the master AC may be resulted from master/backup changeover between the master main board and a backup main board of the switch.

The detecting module 620 may be configured to detect the timer. The detecting module 620 may maintain connections between the AP and authenticated users in response to a determination that the time hasn't expired the preset time, or the detecting module 620 may disconnect the connections between the AP and the authenticated users in response to a determination that the time has expired the preset time.

In an example, as shown in FIG. 6, the device 600 may further include a communicating module 630 configured to receive a notification of enabling a new master AC from the switch, notify the timer module 610 of turning off the timer when the preset time has not expired, and to enable the AP to communicate with the new master AC being integrated on a new master main board of the switch.

In an example, the communicating module 630 may achieve the communication between the AP and the new master AC as follows: sending access authentication information of the authenticated user to the new master AC, so that the new master AC can perform authentication based on the access authentication information to determine whether to allow the authenticated user to stay online; receiving authentication results from the new master AC; maintaining the connections between the AP and the authenticated users when the authentication results indicate that the authenticated users are allowed to stay online, otherwise, disconnect the connections between the AP and the authenticated users.

In an example, as shown in FIG. 6, the device 600 may further include a caching module 640 configured to cache access authentication information from a new user to be authenticated when an authentication request from the new user is received when the timer has not turned off. In this case, when receiving the notification of enabling the new master AC from the switch, the communicating module 630 may achieve the communication between the AP and the new master AC as follows: sending the cached access authentication information of the new user to the new master AC for authentication; receiving an authentication result returned by the new master AC for the new user; updating the new user as an authenticated user and recording the cached access authentication information in a local memory when the authentication result indicates a successful authentication.

The structure of the device shown in FIG. 6 is described above.

Figure 7:
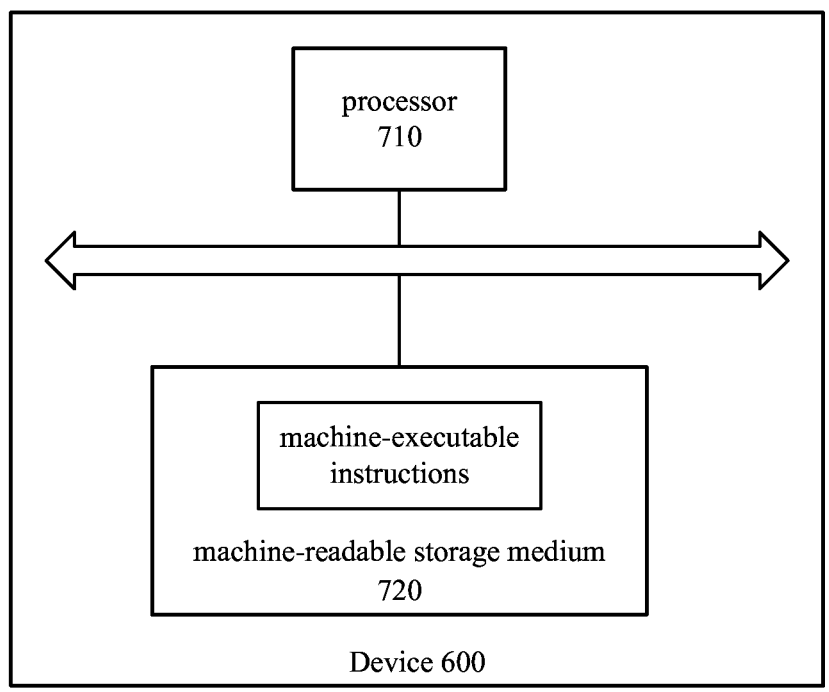
FIG. 7 is a schematic diagram illustrating a hardware structure of the device shown in FIG. 6 according to an example of the present disclosure.

FIG. 7 is a schematic diagram illustrating a hardware structure of the device 600 according to an example of the present disclosure. As shown in FIG. 7, the device 600 may include a processor 710 and a machine-readable storage medium 720.

The machine-readable storage medium 720 is configured to store machine executable instructions.

The processor 710 is configured to load and execute the instructions to: start a timer when detecting abnormal communication between an AP and a master AC being integrated on a master main board of a switch; and detect the timer, and maintain connections between the AP and authenticated users in response to a determination that the timer has not expired a preset time, and disconnect the connections between the AP and the authenticated users in response to a determination that the timer has expired the preset time.

In an example of the present disclosure, the AP is connected to an interface board of the switch.

In an example of the present disclosure, the abnormal communication between the AP and the master AC may be resulted from a master/backup changeover between the master main board and a backup main board of the switch.

In an example, the processor 710 may also be configured to load and further execute the following instructions: receiving a notification of enabling a new master AC from the switch; turning off the timer when the timer has not expired the preset time; and enabling the AP to communicate with the new master AC being integrated on a new master main board of the switch. The communication of the AP with the new master AC may include: sending, by the AP, access authentication information of the authenticated users to the new master AC, so that the new master AC can determine whether to allow the authenticated user to stay online; receiving, by the AP, authentication results returned by the new master AC based on the access authentication information; maintaining the connections between the AP and the authenticated users when the authentication results indicate that the authenticated users are allowed to stay online, otherwise, disconnecting the connections between the AP and the authenticated users.

In an example, the processor 710 may also be configured to load and further execute the following instructions: receiving an authentication request from a new user to be authenticated when the timer has not turned off; caching access authentication information from the new user. In this case, after receiving the notification of enabling the new master AC from the switch and determining that the master/backup changeover between the master main board and the backup mainboard of the switch is completed, communication of the AP with the new master AC may include: sending, by the AP, the cached access authentication information of the new user to the new master AC for authentication; receiving, by the AP, an authentication result returned by the new master AC for the new user, and updating the new user as an authenticated user and recording the cached access authentication information in a local memory when the authentication result indicates a successful authentication.

The hardware structure of the device shown in FIG. 7 is described above.

The foregoing is merely descriptions of examples of the present disclosure and not intended to limit the present disclosure. Any modifications, equivalent substitutions, adaptations made within the spirit and the scope of the present disclosure shall be encompassed in the scope of protection the present disclosure.

The invention claimed is:

1. A method of controlling user access to a wireless network, comprising:
   starting, by an Access Point (AP), a timer when detecting an abnormal communication between the AP and a master Access Controller (AC) being integrated on a master main board of a switch;
   detecting, by the AP, whether the timer the timer has expired a preset time or not;
   maintaining, by the AP, connections between the AP and authenticated users having been authenticated in response to a determination that the timer has not expired the preset time;
   disconnecting, by the AP, the connections between the AP and the authenticated users in response to a determination that the timer has expired the preset time,
   wherein the abnormal communication between the AP and the master AC is resulted from a master/backup changeover between the master main board and a backup main board in the switch,
   the method further comprises:
   receiving, by the AP, a notification of enabling a new master AC from the switch;
   in a case that the timer hasn't expired the preset time;
   turning off, by the AP, the timer, and
   communicating, by the AP, with the new master AC being integrated on a new master main board of the switch.

2. The method according to claim 1, wherein communicating by the AP with the new master AC comprising:
   sending, by the AP, access authentication information of the authenticated users to the new master AC;
   receiving, by the AP, authentication results returned by the new master AC based on the access authentication information;
   maintaining, by the AP, the connections between the AP and the authenticated users in a response to a determination that the authentication results indicate that the authenticated users are allowed to stay online,
   disconnecting, by the AP, the connections between the AP and the authenticated users in a response to a determination that the authentication results indicate that the authenticated users are not allowed to stay online.

3. The method according to claim 1, further comprising:
   receiving, by the AP, an authentication request from a new user to be authenticated in a case that the timer hasn't turned off;
   caching, by the AP, access authentication information from the new user.

4. The method according to claim 3, further comprising:
   sending, by the AP, the cached access authentication information of the new user to the new master AC;
   receiving, by the AP, an authentication result returned by the new master AC for the new user;
   updating, by the AP, the new user as an authenticated user and recording the cached access authentication information in a local memory in a response to a determination that the authentication result indicates a successful authentication.

5. The method according to claim 1, wherein the AP is connected to an interface board of the switch.

6. A device for controlling user access to a wireless network, the device being applied to an Access Point (AP) and comprising:
   a timer module, configured to start a timer when abnormal communication between the AP and a master Access Controller (AC) is detected, wherein the master AC is integrated on a master main board of a switch; and
   a detecting module, configured to detect whether the timer has expired a preset time or not, maintain connections between the AP and authenticated users having been authenticated in response to a determination that the timer has not expired the preset time, and disconnect the connections between the AP and the authenticated users in response to that the detecting module determines that the timer has expired the preset time,
   wherein the abnormal communication between the AP and the master AC is resulted from a master/backup changeover between the master main board and a backup main board in the switch,
   the device further comprises a communicating module, configured to:
   receive a notification of enabling a new master AC from the switch,
   in a case that the preset time has not expired,
   notify the timer module to turn off the timer and enable the AP to communicate with the new master AC being integrated on a new master main board of the switch.

7. The device according to claim 6, wherein the communicating module is configured to:
send access authentication information of the authenticated user to the new master AC;
receive authentication results returned by the new master AC based on the access authentication information;
maintain the connections between the AP and the authenticated users in a case that the authentication results indicate that the authenticated users are allowed to stay online,
disconnect the connections between the AP and the authenticated users in a case that the authentication results indicate that the authenticated user are not allowed to stay online.

8. The device according to claim 6, further comprising:
a caching module, configured to cache access authentication information from a new user to be authenticated, when an authentication request from the new user is received in a case that the timer has not turned off.

9. The device according to claim 8, wherein the communicating module is further configured to:
send the cached access authentication information of the new user to the new master AC;
receive an authentication result returned by the new master AC for the new user;
update the new user as an authenticated user and record the cached access authentication information in a local memory in a case that the authentication result indicates a successful authentication.

10. The device according to claim 6, wherein the AP is connected to an interface board of the switch.

11. A device for controlling user access to a wireless network, the device being applied to an AP and comprising:
a non-transitory machine-readable storage medium configured to store machine-executable instructions; and
a processor configured to execute the machine-executable instructions to:
start a timer when detecting abnormal communication between the AP and a master Access Controller (AC) being integrated on a master main board of a switch; and
detect whether the timer the timer has expired a preset time or not;
maintain connections between the AP and authenticated users having been authenticated in response to a determination that the timer has not expired a preset time; and
disconnect the connections between the AP and the authenticated users in response to a determination that the timer has expired the preset time,
wherein the abnormal communication between the AP and the master AC is resulted from a master/backup changeover between the master main board and a backup main board in the switch,
the processor is further configured to execute the machine-executable instructions to:
receiving, by the AP, a notification of enabling a new master AC from the switch;
in a case that the timer hasn't expired the preset time; turning off, by the AP, the timer, and
communicating, by the AP, with the new master AC being integrated on a new master main board of the switch.

* * * * *